(12) United States Patent
Yoshizawa

(10) Patent No.: US 12,554,085 B2
(45) Date of Patent: Feb. 17, 2026

(54) OPTICAL FIBER RIBBON

(71) Applicant: SUMITOMO ELECTRIC INDUSTRIES, LTD., Osaka (JP)

(72) Inventor: Fumikazu Yoshizawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 223 days.

(21) Appl. No.: 18/449,227

(22) Filed: Aug. 14, 2023

(65) Prior Publication Data

US 2024/0061198 A1 Feb. 22, 2024

(30) Foreign Application Priority Data

Aug. 17, 2022 (JP) .................................. 2022-130082

(51) Int. Cl.
*G02B 6/44* (2006.01)
(52) U.S. Cl.
CPC .................................. *G02B 6/4403* (2013.01)
(58) Field of Classification Search
CPC .................................................... G02B 6/4403

USPC .......................................................... 385/114
See application file for complete search history.

(56) References Cited

U.S. PATENT DOCUMENTS

| 2017/0090135 | A1* | 3/2017 | Sato .................... G02B 6/4405 |
| 2022/0260224 | A1 | 8/2022 | Nishizaki |
| 2022/0404571 | A1* | 12/2022 | Garner .................... C03C 25/12 |

FOREIGN PATENT DOCUMENTS

| CN | 113946025 A | 1/2022 |
| CN | 114008380 A | 2/2022 |
| JP | 2012-027131 A | 2/2012 |
| JP | 2014-228688 A | 12/2014 |

* cited by examiner

*Primary Examiner* — Jerry M Blevins
(74) *Attorney, Agent, or Firm* — McDonald Hopkins LLC

(57) ABSTRACT

An optical fiber ribbon includes a plurality of optical fibers, and a connecting member configured to intermittently connect the plurality of optical fibers adjacent to each other. The connecting member is colorless and transparent to visible light, and is opaque to light in a specific wavelength band other than a visible light region.

4 Claims, 2 Drawing Sheets

OPTICAL FIBER RIBBON

TECHNICAL FIELD

The present disclosure relates to an optical fiber ribbon. This application claims priority based on Japanese Patent Application No. 2022-130082 filed on Aug. 17, 2022, and the entire contents of which are incorporated herein by reference.

In the related art, an optical fiber ribbon including a plurality of optical fibers has been developed. For example, JP2014-228688A discloses an intermittent optical fiber ribbon in which four or more optical fibers are arranged in a parallel row, and in which a coupling portion and a non-coupling portion are intermittently formed between adjacent optical fibers.

SUMMARY

An optical fiber ribbon according to the present disclosure includes a plurality of optical fibers, and a connecting member configured to intermittently connect the plurality of optical fibers adjacent to each other. The connecting member is colorless and transparent to visible light, and is opaque to light in a specific wavelength band other than a visible light region.

DESCRIPTION OF EMBODIMENTS

Figure 1:
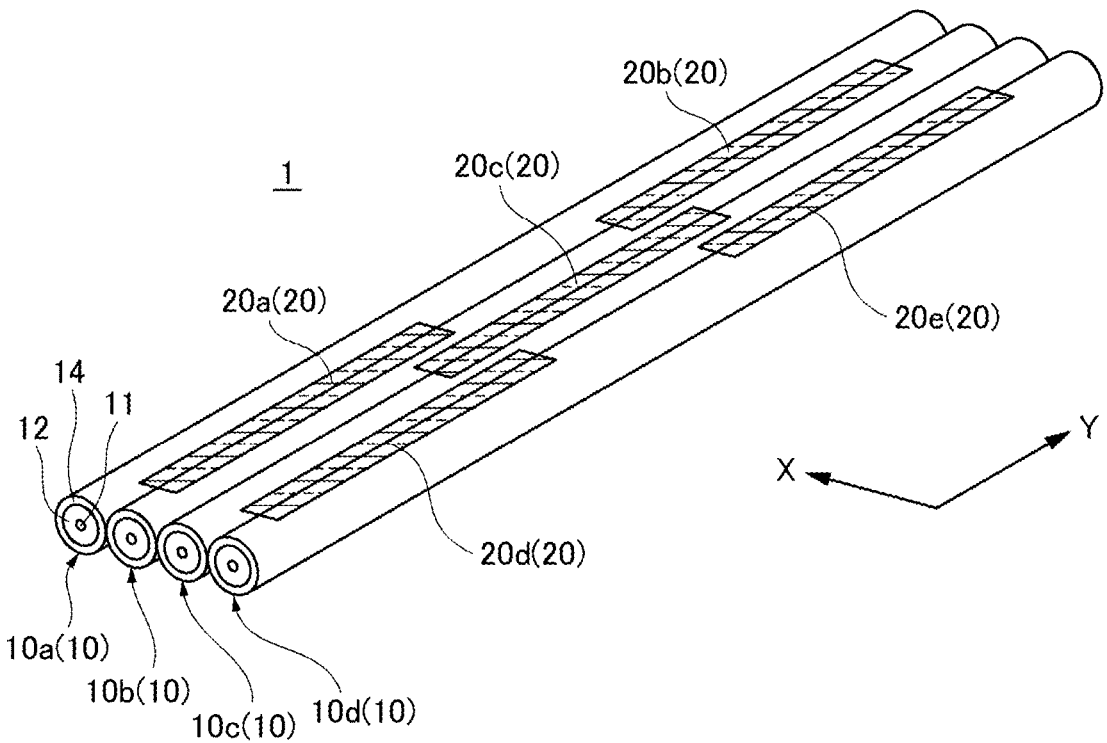
FIG. 1 is a view showing an example of an optical fiber ribbon according to an embodiment of the present disclosure.

In the intermittent optical fiber ribbon as described in JP2014-228688A, an adhesive such as an ultraviolet curable resin or a coating agent is used to connect a plurality of optical fibers. Such a coating agent may be applied to a position that has deviated from an accurate position at the time of application to the optical fiber, and it is conceivable that the optical fiber ribbon cannot maintain a normal structure due to the deviation of the position of the coating agent.

However, even if it is attempted to detect the deviation of the position of the coating agent, it is difficult to detect the deviation of the position since the coating agent is generally colorless and transparent. On the other hand, when a colored coating agent is used, the deviation of the position of the coating agent can be detected visually. However, since the optical fiber is generally colored, the color of the optical fiber may be confused with the color of the coating agent, which may impair the visibility of the optical fiber. Further, printing (marking) for identifying the optical fiber may be applied to a surface of the optical fiber. In such a case, if the colored coating agent is used, the marking may be hidden by the coating agent and become invisible, which may impair the identifiability of the optical fiber.

An object of the present disclosure is to provide an optical fiber ribbon capable of detecting a deviation of a position of a coating agent for connecting a plurality of optical fibers, and capable of preventing a deterioration in the identifiability and visibility of the optical fiber.

According to the present disclosure, it is possible to detect a deviation of a position of a coating agent for connecting a plurality of optical fibers, and it is possible to prevent a deterioration in the identifiability and visibility of the optical fiber.

DESCRIPTION OF EMBODIMENTS OF PRESENT DISCLOSURE

First, embodiments of the present disclosure will be listed and described.

(1) An optical fiber ribbon according to an embodiment of the present disclosure includes:
 a plurality of optical fibers;
 a connecting member configured to intermittently connect the plurality of optical fibers adjacent to each other,
 in which the connecting member is colorless and transparent to visible light, and is opaque to light in a specific wavelength band other than a visible light region.

With such a configuration, for example, a deviation of a position of the connecting member can be detected by being irradiated with light in a specific wavelength band. Since the connecting member is colorless and transparent in a state of not being irradiated with light in the specific wavelength band, it is possible to prevent a deterioration in the visibility of the optical fiber constituting the optical fiber ribbon. When the connecting member is applied to a portion to which printing (marking) is applied, it is possible to check printed characters and the like, and thus it is possible to prevent a deterioration in the identifiability of the optical fiber.

(2) In the optical fiber ribbon according to (1),
 the connecting member may be an adhesive or an ultraviolet curable resin that is opaque to ultraviolet rays.

With such a configuration, the deviation of the position of the connecting member can be detected by irradiating the optical fiber ribbon coated with the connecting member with ultraviolet rays.

(3) In the optical fiber ribbon according to (2),
 the connecting member may be acrylic resin.

With such a configuration, it is possible to implement an optical fiber ribbon including a connecting member that is excellent in transparency and durability and that is opaque to ultraviolet rays.

(4) In the optical fiber ribbon according to (1),
 the connecting member may be an adhesive or an ultraviolet curable resin that is opaque to infrared rays.

With such a configuration, the deviation of the position of the connecting member can be detected by irradiating the optical fiber ribbon coated with the connecting member with infrared rays.

(5) In the optical fiber ribbon according to (4),
 the connecting member may be a resin containing polypropylene or polyethylene.

With such a configuration, it is possible to inexpensively provide a connecting member opaque to infrared rays.

DETAILS OF EMBODIMENTS OF PRESENT DISCLOSURE

A specific example of an optical fiber ribbon according to the present disclosure will be described below with reference to the drawings. The present invention is not limited to these exemplifications, but is indicated by the scope of claims, and is intended to include all modifications within a scope and meaning equivalent to the scope of claims.

Overall Configuration of Optical Fiber Ribbon

FIG. 1 is a view showing an example of an optical fiber ribbon 1 according to an embodiment of the present disclosure. With reference to FIG. 1, the optical fiber ribbon 1 according to an embodiment of the present disclosure includes a plurality of optical fibers 10 and a connecting member 20 that connects the plurality of optical fibers 10. Hereinafter, an extending direction of the optical fiber 10 is referred to as a Y direction, and a direction in which the plurality of optical fibers 10 are arranged is referred to as an X direction.

Each of the optical fibers 10 is, for example, a single core fiber (SCF), and includes one core 11, cladding 12 covering the core 11, and a coating layer 14 covering the cladding 12. An outer diameter of each of the optical fibers 10 is, for example, from 160 μm to 255 μm.

The core 11 has a refractive index higher than a refractive index of the cladding 12 and can guide light. The coating layer 14 includes, for example, two layers of an ultraviolet curable resin layer and a colored layer.

The connecting member 20 is applied so as to intermittently connect the adjacent optical fibers 10 arranged in parallel. The connecting member 20 is, for example, applied to a recess formed between outer peripheries of the adjacent optical fibers 10 and is cured. Specifically, the connecting member 20 has a rectangular shape in a top view, and has, for example, a longitudinal length of approximately 10 mm to 40 mm and a lateral length of approximately 0.10 mm to 0.25 mm.

The connecting member 20 is applied in a manner of extending along the Y direction. In an example shown in FIG. 1, the optical fiber ribbon 1 includes four optical fibers 10a, 10b, 10c, and 10d as the optical fibers 10. The optical fiber ribbon 1 includes five connecting members 20a, 20b, 20c, 20d, and 20e as the connecting member 20.

The connecting members 20a and 20b intermittently connect the optical fiber 10a and the optical fiber 10b. The connecting member 20c intermittently connects the optical fiber 10b and the optical fiber 10c. The connecting members 20d and 20e intermittently connect the optical fiber 10c and the optical fiber 10d. The connecting members 20a, 20b, 20c, 20d, and 20e are colorless and transparent to visible light, and are opaque to light in a specific wavelength band other than a visible light region.

The connecting member 20a and the connecting member 20b are applied in a manner of aligning in the Y direction, and the connecting member 20d and the connecting member 20e are similarly applied in a manner of aligning in the Y direction. The connecting member 20a and the connecting member 20d are applied in a manner of aligning in the X direction, for example, and the connecting member 20b and the connecting member 20e are similarly applied in a manner of aligning in the X direction, for example. The connecting member 20c is applied to a position between the connecting member 20a and the connecting member 20d in the X direction and between the connecting member 20a and the connecting member 20b in the Y direction.

A position and a size of the connecting member 20 shown in FIG. 1 are merely examples, and the position and the size of the connecting member 20 are not limited to those shown in FIG. 1.

The optical fiber ribbon 1 is not limited to a configuration including the four optical fibers 10, and may include, for example, eight, twelve, or twenty-four optical fibers 10.

The optical fiber 10 is not limited to the SCF shown in FIG. 1, and may be, for example, a multi core fiber (MCF).

Description of Problem

Figure 2:
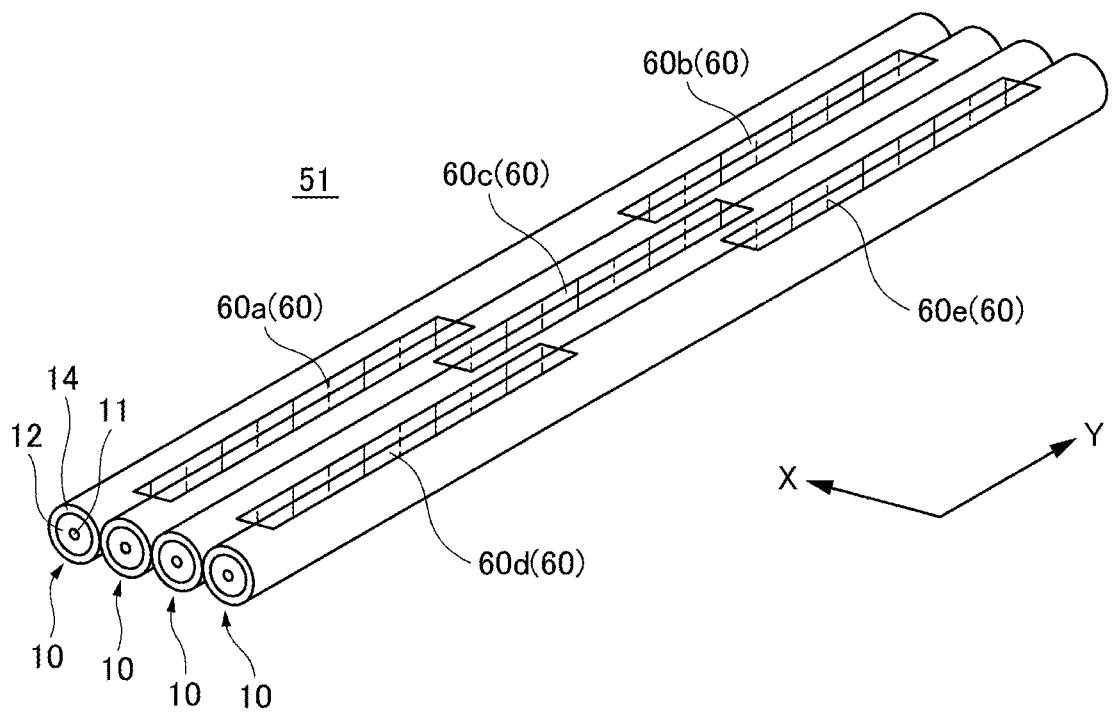
FIG. 2 is a view showing a comparative example of the optical fiber ribbon.

FIG. 2 is a view showing a comparative example of the optical fiber ribbon. With reference to FIG. 2, an optical fiber ribbon 51 according to a comparative example includes the four optical fibers 10a, 10b, 10c, and 10d, similarly to the optical fiber ribbon 1 shown in FIG. 1. The optical fiber ribbon 51 includes five connecting members 60a, 60b, 60c, 60d, and 60e instead of the five connecting members 20a, 20b, 20c, 20d, and 20e shown in FIG. 1. Hereinafter, the connecting members 60a, 60b, 60c, 60d, and 60e are also referred to as a "connecting member 60".

The connecting member 60 is applied so as to intermittently connect the adjacent optical fibers 10 arranged in parallel. More specifically, coating positions of the connecting members 60a, 60b, 60c, 60d, and 60e are the same as coating positions of the connecting members 20a, 20b, 20c, 20d, and 20e shown in FIG. 1, respectively. The connecting member 60 has the same size and shape as the connecting member 20 shown in FIG. 1. However, unlike the connecting member 20, the connecting member 60 is an adhesive or an ultraviolet curable resin that is colorless and transparent to any of visible light, infrared light, and ultraviolet light.

Figure 3:
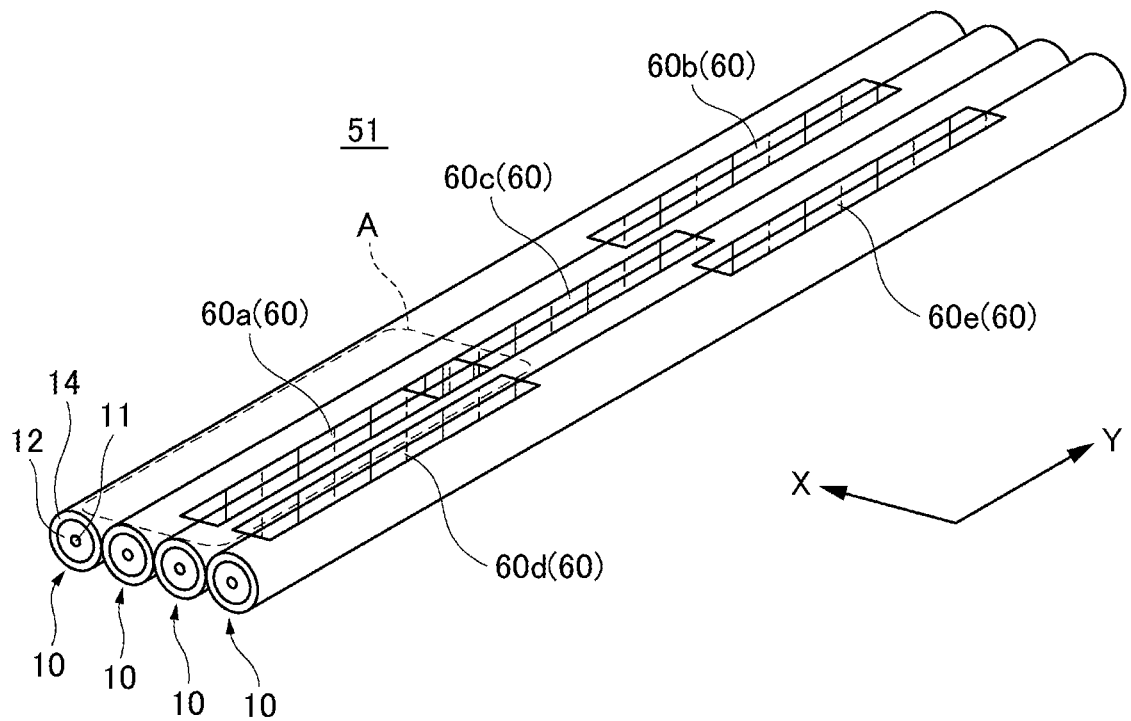
FIG. 3 is a view showing a state in which a coating position of a part of a connecting member of the optical fiber ribbon shown in FIG. 2 has deviated.
Figure 4:
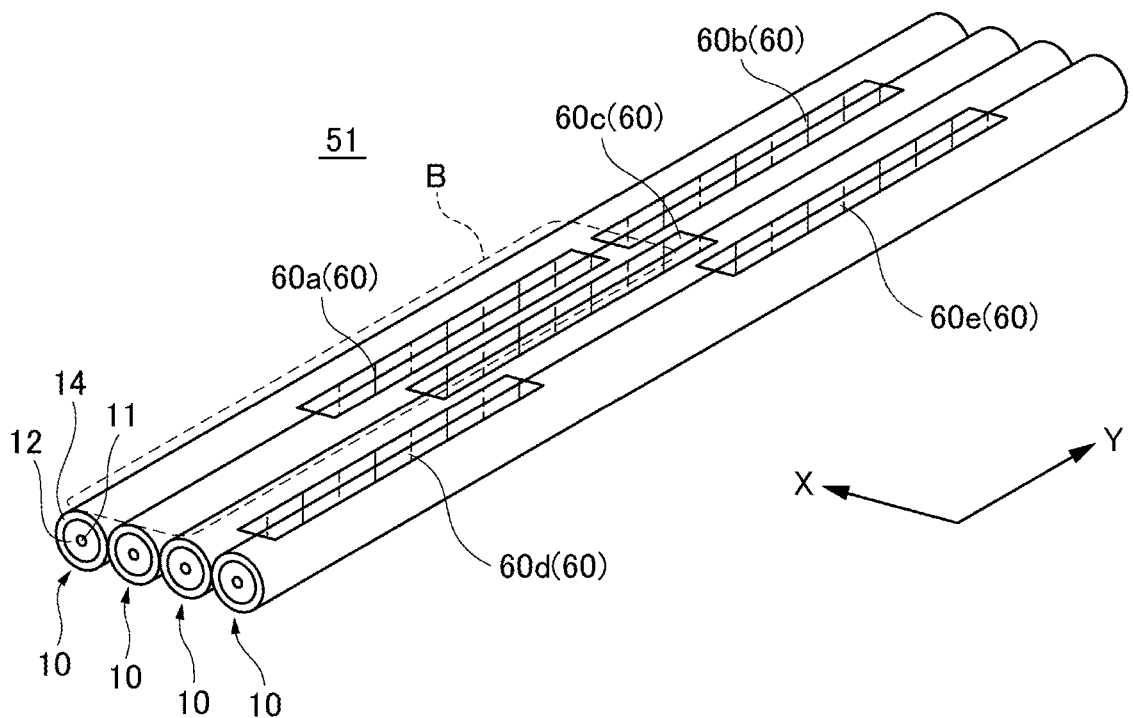
FIG. 4 is a view showing a state in which a coating position of a part of the connecting member of the optical fiber ribbon shown in FIG. 2 has deviated.

When applied to the optical fiber 10, the connecting member 60 may be applied to a position that has deviated from an accurate position. FIGS. 3 and 4 are views showing a state in which a coating position of a part of the connecting member of the optical fiber ribbon shown in FIG. 2 has deviated. Here, it is assumed that a position of each connecting member 60 shown in FIG. 2 is a correct coating position.

For example, in FIG. 3, as compared with FIG. 2, the coating position of the connecting member 60a has deviated in the X direction in a manner of approaching the connecting member 60b as indicated by a frame A. For example, in FIG. 4, as compared with FIG. 2, the connecting member 60a and the connecting member 60c overlap each other due to a deviation of the coating position of the connecting member 60a in the Y direction as indicated by the frame B. A part of the connecting member 60a may deviate in a manner of being curved along the Y direction.

In this way, when the coating position of the connecting member 60 deviates, it is conceivable that the overall sense of unity or flexibility of the optical fiber ribbon 1 is impaired. When the sense of unity is lost, there is a risk of problems in handling, such as difficulty in arranging the plurality of optical fibers 10 provided in the optical fiber ribbon 1 in a line during fusion. When the flexibility is lost, adverse effects such as increased transmission loss may occur. However, since the connecting member 60 is colorless and transparent, even if an attempt is made to detect that the position of the connecting member 60 has deviated using a captured image of the optical fiber ribbon 1, a sensor result of a color identification sensor for the optical fiber ribbon 1, or the like, it is difficult to detect the deviation of the position.

On the other hand, it is conceivable to use a colored connecting member instead of the colorless and transparent connecting member 60. In this case, it is possible to detect that the position of the connecting member has deviated. However, a color of the colored layer in the coating layer 14 of the optical fiber 10 and a color of the connecting member may be confused, and the visibility of the optical fiber 10 may be impaired.

Further, marking such as printing for identifying the optical fiber 10 may be applied to a surface of the optical fiber 10. In such a case, if the colored connecting member is used, the marking may not be visible, and the identifiability of the optical fiber 10 may be impaired.

In view of the above problems, the optical fiber ribbon 1 according to the embodiment of the present disclosure can detect the deviation of the position of the connecting member 20 by the configuration as described later, and can prevent the deterioration of the identifiability and the visibility of the optical fiber 10.

Details of Connecting Member

Example 1

Referring again to FIG. 1, the connecting member 20 is colorless and transparent to visible light, and is opaque to light in a specific wavelength band other than a visible light region. That is, the connecting member 60 according to the comparative example shown in FIGS. 2 to 4 is colorless and transparent regardless of the wavelength band of light to be emitted, whereas the connecting member 20 shown in FIG. 1 is opaque to light in the specific wavelength band.

The specific wavelength band is, for example, a band of 10 nm to 400 nm, which is a wavelength band of ultraviolet rays, and preferably a band of 315 nm to 400 nm.

The colorless transparency of the connecting member 20 includes colored transparency to the extent that the identifiability and visibility of the optical fiber 10 coated with the connecting member 20 are not impaired. The connecting member 20 only needs to have a light transmittance that allows the position of the connecting member 20 to be checked when irradiated with light in the specific wavelength band, and is not limited to a member that blocks 100% of light transmission.

The connecting member 20 is molded with an adhesive or an ultraviolet curable resin that is opaque to light in the specific wavelength band. Specifically, the connecting member 20 is molded with acrylic resin (for example, urethane acrylate resin) or the like that is cured by ultraviolet rays.

According to such a configuration, for example, an image of the optical fiber ribbon 1 after application of the connecting member 20 can be captured by an ultraviolet camera, and the deviation of the position of the connecting member 20 can be detected based on the captured image. Specifically, the captured image (hereinafter, referred to as a "reference image") of the optical fiber ribbon 1 in which all the connecting members 20 are applied to correct positions is acquired in advance, and image processing for comparing the captured image of the optical fiber ribbon 1 to be detected with the reference image is performed. Accordingly, it is possible to detect whether the position of each connecting member 20 applied to the optical fiber ribbon 1 is a correct position.

Example 2

The specific wavelength band is not limited to the wavelength band of ultraviolet rays described in Example 1, and may be, for example, a band of 780 nm or more, which is a wavelength band of infrared rays. Preferably, the specific wavelength band is a band from 780 nm to 1500 nm.

When the specific wavelength band is a band as described above, the connecting member 20 is molded with an adhesive or an ultraviolet curable resin that is opaque to light in the specific wavelength band. Specifically, the connecting member 20 is a resin containing molten polypropylene or polyethylene.

According to such a configuration, for example, an image of the optical fiber ribbon 1 after application of the connecting member 20 can be captured by an infrared camera, and the deviation of the position of the connecting member 20 can be detected based on the captured image. Specifically, by performing image processing for comparing the captured image of the optical fiber ribbon 1 to be detected with the reference image, it is possible to detect whether the position of each connecting member 20 applied to the optical fiber ribbon 1 is a correct position.

In the case of using the connecting member 20 as in Example 1 or Example 2 described above, even if the connecting member 20 is provided on the same surface as the identification printed surface of the optical fiber ribbon 1, visible light passes through the connecting member 20, and thus the printing can be identified. That is, it is not necessary to provide the connecting member 20 in a manner of not covering the printing, which is convenient in a manufacturing process.

The connecting member 20 is not limited to being opaque to ultraviolet rays or infrared rays, and may be transparent to visible light and opaque to light in the specific wavelength band other than the visible light region. The connecting member 20 may be colored in a manner of being opaque to light in the specific wavelength band.

The present disclosure has been described above based on the specific embodiment. However, the present invention is not limited to these exemplifications, but is indicated by the scope of claims, and is intended to include all modifications within a scope and meaning equivalent to the scope of claims.

The invention claimed is:

1. An optical fiber ribbon comprising:
a plurality of optical fibers; and
a connecting member configured to intermittently connect the plurality of optical fibers adjacent to each other,
wherein the connecting member is colorless and transparent to visible light, and is opaque to light in a specific wavelength band other than a visible light region,
wherein the connecting member is an adhesive or an ultraviolet curable resin that is opaque to infrared rays.

2. The optical fiber ribbon according to claim 1, wherein the connecting member is opaque to ultraviolet rays.

3. The optical fiber ribbon according to claim 2, wherein the connecting member is acrylic resin.

4. The optical fiber ribbon according to claim 1, wherein the connecting member is a resin containing polypropylene or polyethylene.

* * * * *